Jan. 3, 1961  G. X. R. BOUSSU ET AL  2,966,933
BEADS FOR PNEUMATIC TIRES
Filed March 7, 1958  2 Sheets-Sheet 1
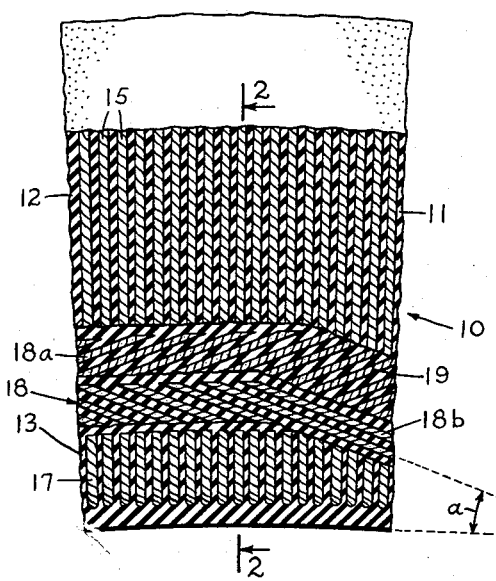
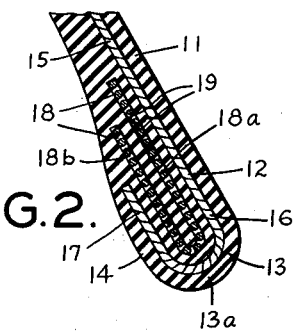
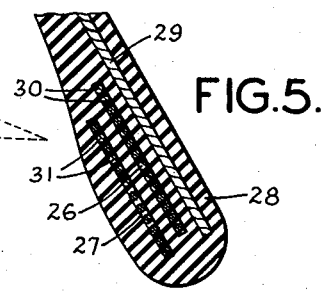
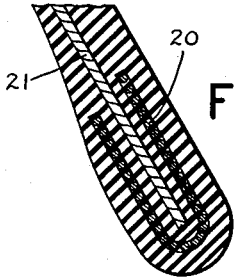
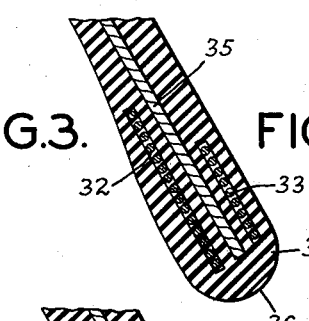
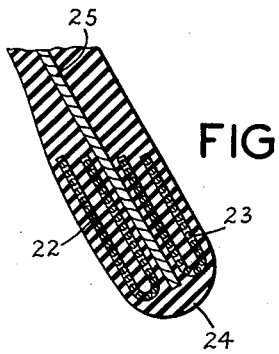
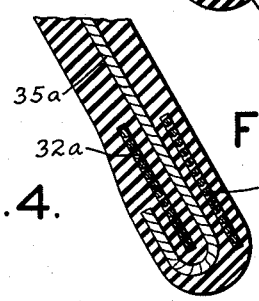
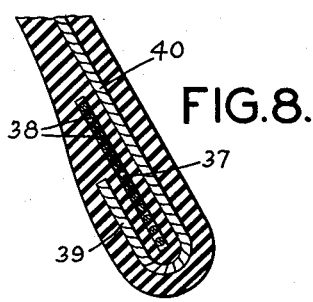
INVENTORS
GABRIEL XAVIER ROGER BOUSSU
LOUIS PIERRE FRANCOIS ANDRE NEUVILLE
LOUIS HENRI NOEL SAINT-FRISON
BY
THEIR ATTORNEYS Jan. 3, 1961  G. X. R. BOUSSU ET AL  2,966,933
BEADS FOR PNEUMATIC TIRES Filed March 7, 1958  2 Sheets-Sheet 2

INVENTORS
GABRIEL XAVIER ROGER BOUSSU
LOUIS PIERRE FRANCOIS ANDRE NEUVILLE
LOUIS HENRI NOEL SAINT-FRISON
BY

THEIR ATTORNEYS

United States Patent Office 2,966,933
Patented Jan. 3, 1961

2,966,933

BEADS FOR PNEUMATIC TIRES

Gabriel Xavier Roger Boussu, Manoir de Beaulieu, Chamalieres, and Louis Pierre Francois André Neuville and Louis Henri Noel Saint-Frison, Clermont-Ferrand, France, assignors to Compagnie Generale des Etablissements Michelin (Robert Puiseux & Cie), Clermont-Ferrand, France Filed Mar. 7, 1958, Ser. No. 719,826

Claims priority, application France Mar. 14, 1957

9 Claims. (Cl. 152—362)

This invention relates to improvements in pneumatic tires or tire casings and it relates particularly to improvements in the beads of such tires or tire casings.

In the manufacture of tubeless tires and tire casings of the type adapted to receive an inner tube, referred to hereinafter generically as tires, the several plies of the tire carcass, in strip-like form and the tread band are assembled on a cylindrical drum to form a laminated endless band. The beads of such tires are reinforced with endless metal rings or hoops formed of wires or cables which are slipped over the ends of the drum and laid over one or more plies of the tire during the tire building operation. The outer edges of the plies are then folded over the bead hoops to enclose them in the plies at the bead edges of the band.

After the band has been built on the drum, it is transferred to a mold where it is molded into the shape of a tire and is vulcanized.

The bead cables or wires are expensive and they introduce an additional element of expense into the manufacture of the tires for the reason that the drum must be stopped when the bead cables or wires are slipped over the ends of the drum in a direction transverse to the direction in which the plies are laid on the drum and thereby interrupting the continuity of the tire building operation. Such interruption, of course, reduces the productivity of the tire builder and adds appreciably to the cost of building the tires.

In accordance with the present invention, endless bead cables or hoops are not used and instead the beads of the tire are reinforced to prevent expansion or elongation by laying in the bead zone of the tire carcass while it is being built one or more narrow strips of ply material which extend around the drum in the same direction as the other plies. The narrow strips contain substantially inextensible metallic cables extending at an acute angle to the axis of the strip or strips. The inclination of the cables to the meridian planes of the tire and to the other ply or plies in the tire when it is completed and the adhesion thereto of the rubber prevent substantial sidewise displacement of the cables and thereby renders the beads inextensible so they cannot expand and be dislodged from the wheel rim even under extreme operating conditions.

More particularly, a preferred form of the invention includes at least two narrow strips in the bead area of the tire in which the cables in one strip are disposed at an obtuse angle to the cables in the adjacent strip so that they cross each other and thereby restrain each other against shifting. Relative movement of the cables in each of the bead plies can be restrained further by embedding them in rubber or elastomeric material which has a relatively high modulus of elasticity and of considerable rigidity. When the bead plies are used in conjunction with cable-containing plies in the carcass or sidewalls of the tire, these can be arranged to cross each other to form a triangulated structure which is of rigid and inextensible nature and hence is highly resistant to centrifugal force, the air pressure in the tire and other forces which might tend to expand or stretch the beads of the tire in use.

A plurality of narrow strips of bead-reinforcing material having parallel, inclined cables therein can be used in the beads of the tires or the inclined and crossing relation of the cables can be obtained by building into the beads a folded strip having the cables therein disposed on a bias therein. By folding the cable-containing strip of material, the cables in the overlapping portions of the folded strip cross and are disposed at an angle to each other to form inextensible laminated bands in the beads when the tire is vulcanized.

Tires can be built much more efficiently by the use of strips of the type described above instead of the endless bead wires or hoops, for the reason that the strips are laid on the plies of the tire casing in the same direction and in the same way as the other plies of the tire carcass. Preferably the innermost plies of the carcass are folded over the bead reinforcing strip or strips. If a wider bead reinforcing strip is to be folded to form a double ply this can be done at the time the inner carcass plies are folded to form the beads. In this way, all of the plies can be assembled on the drum without stopping the drum, thereby increasing the speed at which a tire can be built.

For a better understanding of the present invention, reference may be had to the accompanying drawing in which:

Figure 1 is a side elevational view of a portion of the tire embodying the present invention with portions of the tire broken away to illustrate the arrangement of the plies in the sidewall and beads of the tire;

Figure 2 is a view in cross-section taken on line 2—2 of Figure 1;

Figure 3 is a view in cross-section taken through a bead and an adjacent portion of the sidewall of a modified form of tire according to the present invention;

Figure 4 is a view in cross-section taken through the bead and an adjacent portion of the sidewall of a modified form of tire;

Figure 5 is a view in cross-section taken through still another form of bead and a portion of the adjacent sidewall of the tire according to the present invention;

Figure 6 is a cross-sectional view through the bead and adjacent portion of the sidewall of another tire embodying the present invention;

Figure 7 is a view in cross-section taken through the bead and an adjacent portion of the sidewall of still another form of tire;

Figure 8 is a view in cross-section taken through the bead and an adjacent portion of the sidewall of another form of tire embodying the present invention;

Figure 9:
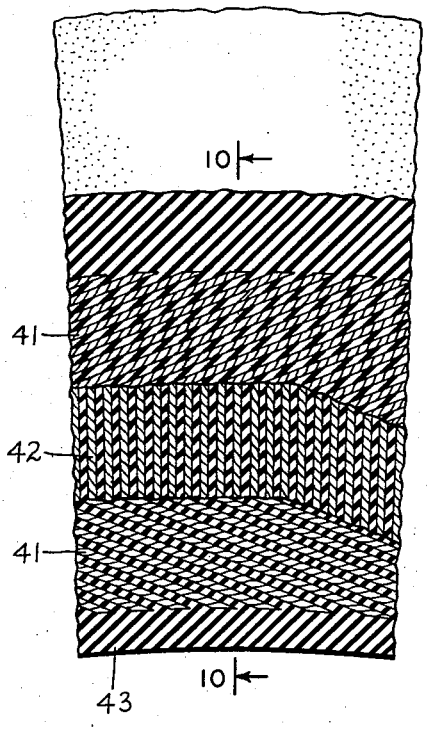
Figure 9 is a view similar to Figure 1 of still another form of tire having no reinforcing ply in the sidewalls.

Bead constructions of the type embodying the present invention can be utilized in conventional pneumatic tires having a carcass reinforced by means of cords, threads, wires, filaments or cables formed of natural or synthetic textile fibers or metallic or non-metallic fibers, wires or filaments, these reinforcing elements being referred to generically therein as cables. In the form of the invention illustrated, the tire casing 10 has sidewalls 11 which are reinforced by means of at least one ply 12 of reinforcing cables which are embedded in and adhered to the surrounding natural or synthetic rubber of the carcass of the tire.

At the free edge of each sidewall 11 is formed the bead 13 of the tire 10 which, as is usual, is of somewhat enlarged cross-sectional area and is appropriately formed on its outer surface 14 to fit tightly against, and in the case of tubeless tires engage in air-tight relation to, the rim of the vehicle wheel on which the tire is used.

In accordance with the present invention, instead of using a metallic bead ring or hoop, the bead is reinforced by means of a narrow ply or a plurality of narrow plies which contain a series of inextensible metallic wires or cables, the cables in each ply being parallel and being embedded or enclosed in a layer of natural or synthetic rubber. In the tire shown in Figures 1 and 2, the carcass or sidewall ply 12 contains parallel cables 15, extending meridianally of the tire. The outer edge of the ply extends into the bead and is folded back on itself to provide parallel layers 16 and 17 within the area of the bead 13. Also, the tire has bead reinforcements formed of a folded ply strip 18 containing parallel metallic cables or wires 19, referred to hereinafter as inextensible cables, embedded in or adhered together by natural or synthetic rubber or similar rubbery material. As shown in Figure 1, the inextensible cables 19 in the ply 18 are arranged at an acute angle $\alpha$ between about 5° and 30°, to the edges of the ply strip 18. The angularity of the inextensible cables must be such that the ply can conform to the change in shape of the tire as it is converted from its band-like shape on the drum to its doughnut like form in the mold. The inextensible cables must be free to shift angularly as the band is expanded during molding and vulcanizing without however, causing the adjacent inextensible cables to shift to such an extent that they move out of parallelism into crossing relation.

As shown in Figure 2, the ply 18 is folded along about its center line to form the two adjacent overlapping ply sections 18a and 18b. In so folding the ply 18, the inextensible cables in section 18a will cross the inextensible cables in section 18b at an obtuse angle as shown in Figure 1. When the tire is molded and vulcanized, the cables 15 of the carcass ply 12 extend substantially meridianally of the tires and the inextensible cables in the bead reinforcing ply sections 18b and 18a will be sharply inclined to the edge 13a of the bead. As indicated above, the angle $\alpha$ of the inextensible cables should be between about 5 and 30° to the tangent in order to reinforce the bead and render it inextensible. A lesser inclination may cause crossing of the inextensible cables in each ply section 18a and 18b during molding of the tire and a greater inclination reduces the inextensibility of the bead.

The arrangement of the cables in the ply 12 and the inextensible cables in the ply sections 18a and 18b is such as to form a triangulated arrangement which is highly resistant to stresses in all directions in the planes of the triangles formed by the crossing cables in the plies. Inasmuch as the inextensible cables as well as the carcass ply 12 are embedded in and adhered strongly to the rubber in the tire carcass, they cannot shift substantially and resistance to shifting can further be increased by using a harder type of rubber in the bead 13 than in the remainder of the tire if desired. For example, a synthetic or natural rubber having a modulus of elasticity exceeding 350 grams per square millimeter at 100% elongation can be used to bond together the inextensible cables in the ply 18 and additional layers of such harder and more rigid rubber can be included in the bead 13.

The relation of the bead ply 18 and the carcass ply 11 can be modified considerably. Thus, instead of having the carcass ply bent outwardly towards the outer surface of the bead 13, it can extend into the bead and be bent inwardly toward the inner surface of the tire to enclose, at least partially, the folded ply 18. It can also extend into the bead inwardly of the bead ply 18 but without being turned up. Moreover, as shown in Figure 3, an inextensible cable-containing ply 20 can be folded around the lower edge of the carcass or sidewall ply 21 with the inextensible cables extending at the angles indicated in Figure 1. If desired, more than one carcass ply 21 can be included in the tire and these additional carcass plies may extend into the bead areas of the tire. Moreover, as shown in Figure 4, additional reinforcement may be obtained by providing two folded plies 22 and 23 of inextensible cables in the bead 24 or pairs of separate plies on opposite sides of one or more cable-containing carcass or sidewall plies 25. The carcass ply 25 can extend into or between the sides of one or the other of the folded bead reinforcing plies 22 and 23 or be folded around both of the plies 22 and 23.

While in the preferred form of the invention, a plurality of bead-reinforcing plies of inextensible cables are formed of a folded strip or folded strips containing inextensible cables, two or more separate metallic cable reinforced plies 26 and 27 may be used in the bead 28 in conjunction with one or more carcass plies 29, as shown in Figure 5, the carcass ply 29 extending inwardly (as shown) or outwardly of the plies 26, 27. The cables 30 in the ply 26 and the cables 31 in the ply 27 cross in Figure 1 at an obtuse angle to render the bead 28 inextensible.

Also, as shown in Figure 6, inextensible cable-containing bead strips 32 and 33 can be located in the bead 34 on opposite sides of the carcass ply 35 and in this case also, the inextensible cables are disposed at an obtuse angle to each other and at an acute angle to the inner edge 36 of the bead in an arrangement similar to that shown in Figure 1.

The bead construction shown in Figure 7 differs from that shown in Figure 6, in that the edge of the carcass ply 35a is bent outwardly and upwardly around the outermost ply 32a of inextensible bead reinforcing cables to attach the carcass ply 35a securely to the bead and the bead reinforcing plies 32a and 33a. Various other modifications of the carcass ply and the bead reinforcing plies are possible as for example, by bending the end of the carcass ply 35a inwardly and upwardly around the carcass ply 33a.

While in the preferred form of the invention, two or more bead reinforcing plies containing inextensible cables are used, in some instances, particularly in low pressure tires, it is possible to utilize only one bead reinforcing ply containing parallel inextensible cables, as illustrated in Figure 8. In this form of the invention, the reinforcing ply 37 is formed of inextensible cables 38 inclined at the same angle as the cables 19 shown in Figure 1 and disposed within a fold 39 formed in the cable-reinforced carcass ply 40. Other arrangements of the ply 40 and the ply 37 are possible, for example, the loop 39 on the carcass ply may be omitted so that the carcass ply 40 extends parallel with the bead reinforcing ply 37 adjacent to either side of it. Also, the carcass ply 40 can be disposed outwardly of the bead reinforcing ply 37 parallel with it and folded around it in the manner shown in Figure 8. The bead shown in Figure 8 or the modifications thereof described above, may be formed partially or wholly of a rubbery material of relatively high modulus of elasticity, when vulcanized, to compensate for the omission of one of the bead plies of inextensible cables. In this way, the cables in the ply 37 are secured against substantial relative shifting movement and the extensibility of the bead is limited thereby. Moreover, it is desirable to have the cables in the carcass or sidewall ply 40 crossing the inextensible cables 38 at a relatively large angle to restrain the inextensible cables 38 against shifting in any direction.

Figure 10:
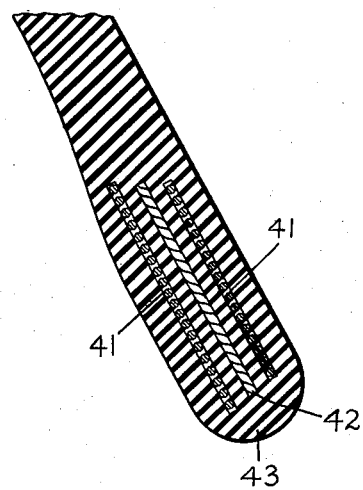
Figure 10 is a view in cross-section taken on line 10—10 of Figure 9.

Bead reinforcing plies of the type described above can be used in the beads of tires which do not have cable-reinforced carcass plies extending into the bead areas. Thus, if the carcass plies are omitted, adequate strength is imparted to the sidewalls and the beads of the tires are rendered rigid and inextensible by forming them of a synthetic or natural rubber having a very high modulus of elasticity, for example, at least 800 grams per square millimeter at 100% elongation. In this case, as shown in Figures 9 and 10, it is advisable to have a bead construction containing at least two bead strips 41 whose inextensible cables are disposed at an obtuse angle to each other and at an acute angle to the inner edge 43 of the bead and, between them, at least one additional bead strip 42 whose parallel cables are disposed at a substantially right angle to the inner edge of the bead so as to form a triangulated lattice with the cables of the two other bead strips.

From the foregoing description, it will be apparent that beads for pneumatic tires embodying the present invention are susceptible to wide modifications and therefore the forms of the invention described herein should be considered as illustrative.

We claim:

1. A tire comprising an apex portion, sidewalls on opposite sides of said apex portion and beads at the free edges of said sidewalls, and at least one narrow ply in each bead containing inextensible cables adherent to rubber, said inextensible cables being substantially parallel and inclined at an acute angle to the inner edge of the bead to restrain the bead against extension circumferentially thereof, said beads being devoid of endless bead rings.

2. A tire as set forth in claim 1, comprising a plurality of narrow plies containing inextensible cables in each bead, said inextensible cables in one of said plies crossing the inextensible cables in an adjacent narrow ply at an obtuse angle.

3. A tire as set forth in claim 2 in which said narrow plies in each of said beads are separate.

4. A tire as set forth in claim 2 in which at least two of said narrow plies are parallel sections of a single ply strip containing parallel inextensible cables, said strip being folded substantially on its centerline, said inextensible cables in one of said sections crossing the inextensible cables of the other of said sections at an obtuse angle.

5. A tire as set forth in claim 1, in which the angle between the inextensible cables and the inner edge of said bead is between about 5 degrees and 30 degrees.

6. A tire as set forth in claim 1 in which said inextensible cables in said bead are embedded in a rubbery material having a modulus of elasticity of at least 350 grams per square millimeter.

7. A tire comprising an apex portion, sidewalls on opposite sides of said apex portion and beads at the free edges of said sidewalls, cable-containing plies in each sidewall extending into the beads, and at least one narrow ply in each bead containing inextensible cables adherent to rubber, said inextensible cables being substantially parallel and inclined at an acute angle to the inner edge of the bead and crossing the cables of the sidewall ply to restrain said bead against extension in a circumferential direction, said beads being devoid of endless bead rings.

8. A tire as set forth in claim 7 in which said sidewalls plies are turned up upwardly around at least one narrow bead ply.

9. A tire comprising an apex portion, sidewalls on opposite sides of said apex portion and beads at the free edges of said sidewalls made from rubber, one narrow ply in each bead containing inextensible cables adherent to rubber parallel to each other and disposed substantially in meridian planes of the tire, and at least two narrow plies in each bead containing inextensible cables adherent to rubber, said inextensible cables being substantially parallel to each other in each ply and inclined at an acute angle to the inner edge of the bead and crossing the cables of the meridian narrow ply to restrain said bead against extension in a circumferential direction, the rubber from which said beads are formed having a modulus of elasticity of at least 350 grams per square millimeter at 100% elongation and said beads being devoid of endless bead rings.

References Cited in the file of this patent

UNITED STATES PATENTS

| | | |
|---|---|---|
| 1,009,366 | Wirt | Nov. 21, 1911 |
| 2,493,614 | Bourdon | Jan. 3, 1950 |
| 2,811,998 | Bourdon | Nov. 5, 1957 |

UNITED STATES PATENT OFFICE
CERTIFICATION OF CORRECTION

Patent No. 2,966,933            January 3, 1961

Gabriel Xavier Roger Boussu et al.

It is hereby certified that error appears in the above numbered patent requiring correction and that the said Letters Patent should read as corrected below.

Column 4, line 16, for "metallic" read -- inextensible --.

Signed and sealed this 30th day of May 1961.

(SEAL)
Attest:

ERNEST W. SWIDER
Attesting Officer

DAVID L. LADD
Commissioner of Patents